United States Patent Office 3,618,414
Patented Nov. 9, 1971

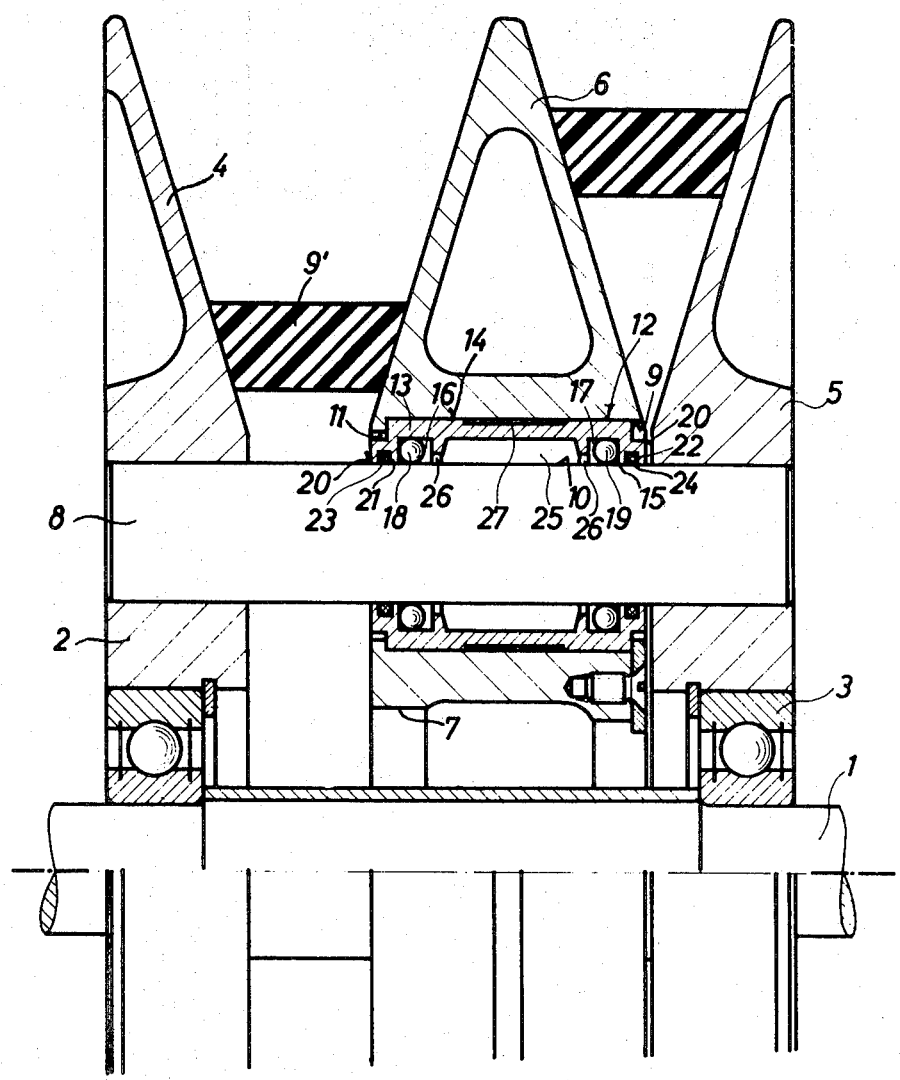

3,618,414
VARIABLE V-BELT TRANSMISSION
Robert Ruprecht, Aichelberg, Kreis Esslingen (Neckar), Germany, assignor to Ernst Heinkel Aktiengesellschaft, Stuttgart-Zuffenhausen, Germany
Filed Oct. 27, 1969, Ser. No. 869,587
Claims priority, application Germany, Oct. 25, 1968, P 18 05 102.0
Int. Cl. F16h 55/52
U.S. Cl. 74—230.17                    12 Claims

ABSTRACT OF THE DISCLOSURE

The reciprocable flange of an endless variable V-belt transmission is axially movably mounted on a series of axially parallel guide rods by means of a plurality of roller bearing elements pairwise accommodated and retained in axially spaced circumferential grooves of a one-piece hub member fixedly mounted in the reciprocable flange.

BACKGROUND OF THE INVENTION

The present invention relates to an endless variable V-belt transmission of large diameter and having at least one stationary and one reciprocable flange, the latter being axially movably mounted by means of roller bearing elements on a series of axially parallel guide rods fixedly received in at least one stationary flange.

Endless variable belt transmissions normally comprise two variable-pitch sheaves each of which includes an axially fixed and an axially movable flange. One of the movable flanges is displaced whenever the operator wishes to change the ratio of the transmission whereby the belt automatically changes the axial position of the other movable flange.

Belt transmissions of this type and having flanges of large diameter usually are heavy loaded and should, consequently, be designed and able to withstand unusual strain especially in those cases when they have to rotate at high speeds and, in addition, are to transmit large powers.

In conventional constructions, the movable flanges are mounted on the main shaft or on a series of axially parallel guide rods by means of discrete and pairwise arranged anti-friction bearings axially spaced relative to each other and accommodated in an annular chamber defined between the cylindrical internal surface of the movable flange and the peripheral surface of the main shaft on which the movable shaft is mounted.

Such bearings usually include disc-shaped inner races with a sleeve-like spacer between the inner races, outer races parallel with and slightly axially spaced from the inner races, and roller bearing elements retained between the inner and outer races.

In order to maintain the unity of these discrete components and to prevent radial and axial displacement of the same, relative to the movable flange, hitherto only the relatively narrow outer races were formed along their outer peripheral surface with a substantially shallow groove of about 0.1 mm. deep for the introduction therein of a hardenable substance in order to bend their outer surface to the inner cylindrical surface of the movable flange.

However, such fixation of the anti-friction bearings in the movable flange has proven to be unsatisfactory under those circumstances when large energies have to be transmitted by the transmission and more in particular than when large axial forces are exerted on the movable flange as a result of non-alignment of the transmission belt with the gap in which it is received and which is defined between the movable and stationary flange of the transmission.

In the latter instance, the outer races eventually became loosened and, under circumstances, even became disengaged from the antifriction bearings as a result of repeated axial movement of the loosened antifriction bearings against the outer races.

SUMMARY OF THE INVENTION

Object of the present invention is to provide a movable flange arrangement with antifriction bearings which suitably overcome the above disadvantages and which are positively fixed to the movable flange and secured against loosening.

Such an arrangement according to the present invention comprises a shaft member having an outer cylindrical peripheral surface and a flange member axially movable on the shaft member and having an internal surface spacedly surrounding the peripheral surface. Antifriction bearing means are provided between the two surfaces and comprises a one-piece hub member surrounding the peripheral surface within the confines of the internal surface and secured to the shaft member. The one-piece hub member comprises an inner peripheral surface surrounding the outer peripheral surface of the shaft member and is provided with at least a pair of axially spaced circumferential grooves and a plurality of roller bearing elements accommodated and retained in each of the grooves and engaging the peripheral surfaces of the one-piece hub member and the shaft member.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

The single figure of the drawings is a fragmentary axial sectional view of an endless variable V-belt transmission which embodies the present invention.

DESCRIPTION OF THE PREFERRED EMBODIMENTS

The single figure illustrates a portion of an endless variable V-belt drive or transmission of large diameter and which comprises a main shaft 1 which is stationary and is provided with antifriction bearings 2, 3 for two axial fixed flanges 4, 5, disposed at the opposite sides of a reciprocable flange 6. The latter is provided with a cutout 7 for the shaft 1 and is axially movably mounted on a series of axially parallel guide rods 8 (only one shown). The ends of the guide rods 8 are mounted in the fixed flanges 4, 5.

In the illustrated embodiment, a transmission belt 9' travels in the gap defined between the flanges 6 and 5.

Due to the fact that the flange 6 is mounted on the guide rods 8, the moments of forces acting upon the flanges 6 and 5 when the transmission is in actual use are smaller than if the flange 6 were mounted directly on the main shaft 1.

The movable flange 6 has a cylindrical internal surface 9 which spacedly surrounds the peripheral surface 10 of the guide rod 8 to define therewith an annular chamber 11 for accommodating antifraction bearing means, generally indicated at 12.

The antifriction bearing means are seen to comprise a one-piece cylindrical hub member 13 having an outer peripheral surface 14 secured to the internal surface 9 of the movable flange 6 and having a cylindrical inner surface 15 which surrounds the peripheral surface 10 of the guide rod 8.

The one-piece hub member 13 extends across the entire internal surface 9 of the flange 6 and is provided with a pair of axially spaced circumferential grooves 16, 17 for accommodating and retaining in each one of them an annulus of antifriction rolling elements 18, 19 which engage the peripheral surfaces 10 and 15 in rolling contact.

Intermediate the side walls 20 of the hub member 13 and the circumferential grooves 16 and 17, additional annular grooves 21, 22 are provided for accommodating sealing elements, for example in the form of elastically deformable O-rings 23, 24 which bear against the peripheral surface 10 to prevent escape of lubricant and to prevent entry of foreign matter. Lubricant is stored in an annular central compartment 25 defined between the peripheral 10, the grooves 16 and 17, and the inner surface 15. The grooves 16 and 17 which accommodate the respective balls communicate with the central compartment 25 via recesses or cutouts 26 to lubricate the balls.

The central compartment is dimensioned so that no lubricant needs to be refilled during the entire life of the transmission.

Centrally formed in the outer peripheral surface 14 of the one-piece hub member 13, is an overall shallow peripheral recess 27 which comprises a plurality of corrugations, not shown, and a hardening filling substance is introduced for bonding the hub member 13 to the cylindrical internal surface 9 of the movable flange 6.

The axial length of the recess 27 preferably is about ⅓ of the transverse length of the hub member 13 and, consequently, ⅓ of the width of the internal surface 9 of the movable flange 6.

In addition to or instead of forming the recess 27 in the location as shown, further recesses may be located in the internal surface 9 of the movable flange 6 opposite the location of recess 27, or may be located at both sides of the same.

The main advantage obtained with the one-piece cylindrical hub member 13, embodied as hereinbefore described, is a relatively wide recess 27 for the introduction of the hardening filling substance which, upon hardening, ensures that under no circumstances the hub member 13 can become disengaged from the movable flange 6, this contrary to the well known art devices.

In addition, and instead of using discrete inner and outer races with a spacer member therebetween, the present invention utilizes a one-piece antifriction member which, under no circumstances, can become disintegrated.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalance of the claims.

What is claimed as new and desired to be protected by Letters Patent is set forth in the appended claims:

1. In a sheave, a combination comprising a shaft having an outer peripheral surface; a flange member axially movable along said shaft and having an internal cylindrical surface surrounding said outer cylindrical surface radially spaced therefrom; antifriction bearing means located in the space between said surfaces and comprising a one-piece hub member having an outer cylindrical surface secured to said internal surface of said flange member and having an inner peripheral surface surrounding said outer peripheral surface of said shaft and being provided with a pair of axially spaced groove, and a plurality of rolling elements in each of said grooves in rolling contact with said outer peripheral surface; indent means in the cylindrical surface of at least one of said members; and a hardenable filling material in said indent means to fixedly bond said hub member to said internal surface of said flange member.

2. A combination as defined in claim 1, wherein said indent means comprises at least one shallow annular groove in said cylindrical surface of said at least one member.

3. A combination as defined in claim 1, wherein said outer surface of said one-piece hub member extends across substantially the entire width of said internal surface of said flange member, said indent means having a width substantially corresponding to ⅓ of the width of said outer surface of said one-piece hub member.

4. A combination as defined in claim 1, wherein said indent means extends in said internal surface of said flange member.

5. A combination as defined in claim 1, wherein said indent means extends in said outer surface of said one-piece hub member.

6. A combination as defined in claim 1, wherein said indent means comprises at least one recess and a plurality of grooves in said recess.

7. A combination as defined in claim 6, wherein said at least one recess is corrugated.

8. A combination as defined in claim 6, wherein said at least one recess extends centrally in said outer surface of said one-piece hub member.

9. A combination as defined in claim 6, wherein said indent means comprises at least two recesses and a plurality of grooves in said recesses, and wherein said recesses extend in said outer surface of said one-piece hub member at opposite ends thereof.

10. A combination as defined in claim 1, wherein said inner peripheral surface of said hub member is further provided with additional grooves adjacent said grooves accommodating said rolling elements, and sealing elements received by said additional grooves for sealing engaging said outer peripheral surface of said shaft member.

11. A combination as defined in claim 10, wherein sealing elements are consttiuted by O-rings.

12. A combination as defined in claim 10, wherein said inner peripheral surface of said hub member defines with said outer peripheral surface of said shaft member a lubricant-containing central compartment disposed between said grooves accommodating said rolling elements and communicating with the said last mentioned grooves through passages provided therein for lubricating said rolling elements.

References Cited
UNITED STATES PATENTS

| | | | |
|---|---|---|---|
| 2,556,512 | 6/1951 | Ammon | 74—230.17 |
| 2,948,024 | 8/1960 | Swanson | 348—187 |
| 3,094,320 | 6/1963 | Huck | 74—230.17 C |
| 3,293,930 | 12/1966 | Schlesinger et al. | 74—230.17 C |
| 3,400,600 | 9/1968 | Ruprecht et al. | 74—230.17 C |
| 3,504,560 | 4/1970 | Wunsch | 74—230.17 C |

CORNELIUS J. HUSAR, Primary Examiner